United States Patent
Bevier

[11] Patent Number: 5,806,323
[45] Date of Patent: Sep. 15, 1998

[54] ADSORBENT BASED AIR CONDITIONING SYSTEM

[76] Inventor: William E. Bevier, 6 W. Grimsby Rd., Kenmore, N.Y. 14223

[21] Appl. No.: 876,342

[22] Filed: Jun. 16, 1997

[51] Int. Cl.$^6$ .................................................. F25D 17/06
[52] U.S. Cl. ........................ 62/91; 62/271; 261/DIG. 4; 261/DIG. 15
[58] Field of Search ................. 62/92, 94, 271, 62/93, 91; 261/127, 138, 146, 147, 94, DIG. 4, DIG. 15; 126/113

[56] References Cited

U.S. PATENT DOCUMENTS

| | | |
|---|---|---|
| 1,872,783 | 8/1932 | Miller . |
| 1,992,515 | 3/1935 | Hausen ........................................ 62/271 |
| 3,042,383 | 7/1962 | Pennington .................................. 62/91 |
| 4,180,126 | 12/1979 | Rush et al. ................................... 165/59 |
| 4,197,713 | 4/1980 | Bulang ......................................... 62/94 |
| 4,484,617 | 11/1984 | Sizmann ....................................... 165/1 |
| 5,176,005 | 1/1993 | Kaplan ......................................... 62/94 |
| 5,222,375 | 6/1993 | Conrad et al. ............................. 62/271 |
| 5,301,439 | 4/1994 | Wang .......................................... 96/125 |
| 5,435,150 | 7/1995 | Khelifa et al. ............................. 62/271 |

*Primary Examiner*—William Doerrler
*Attorney, Agent, or Firm*—Arthur S. Cookfair; James J. Ralabate

[57] ABSTRACT

An adsorbent-based air conditioning system for conditioning an air supply to an enclosed space, such as a building, room, or the passenger compartment of a motor vehicle, aircraft, or the like, utilizes interchangeable adsorbent-containing vessels. Two of the vessels are employed to condition the air supply with respect to temperature and humidity while, at the same time a third and, optionally, a fourth vessel are regenerated by drying and cooling to provide replacements vessels as needed. In operation, ambient air is dehumidified by passing through vessel 1 and the moisture collected in the vessel by adsorption. The exiting air may be cooled by means of a heat exchanger, then directed through vessel 2, containing moist adsorbent, for further cooling and humidification. The air is then supplied to the room, or other space to be conditioned. A heat source, such as a solar collector, or auto exhaust heat, is used to provide a stream of hot air which is passed through a third vessel to dry the adsorbent therein by desorption. Vessel 3 is then cooled by passing stream of cool air therethrough. The vessels are interchangeable and rotatable so that: as the adsorbent in vessel 1 becomes saturated, it is replaced by vessel 3, which has been cooled and dried; vessel 2 is replaced by vessel 1 to provide a moist adsorbent to humidify the air passing through, and vessel 3 is replaced by vessel 2, to be regenerated.

30 Claims, 9 Drawing Sheets

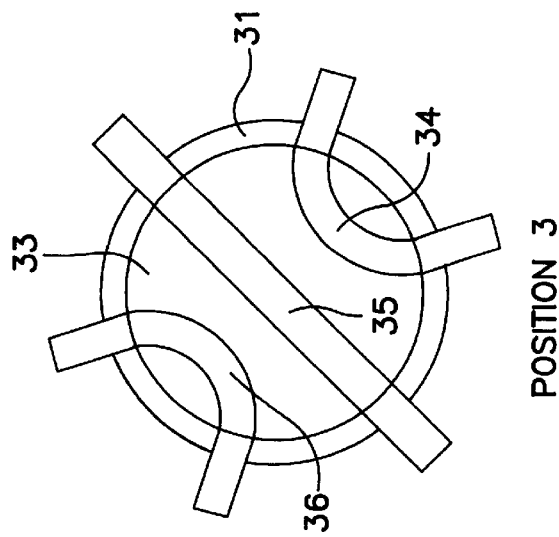
FIG. 7C POSITION 3
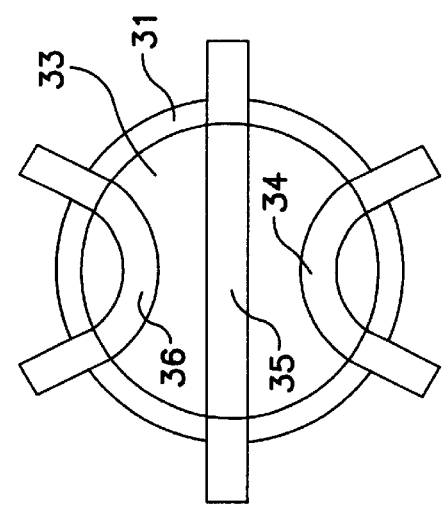
FIG. 7B POSITION 2
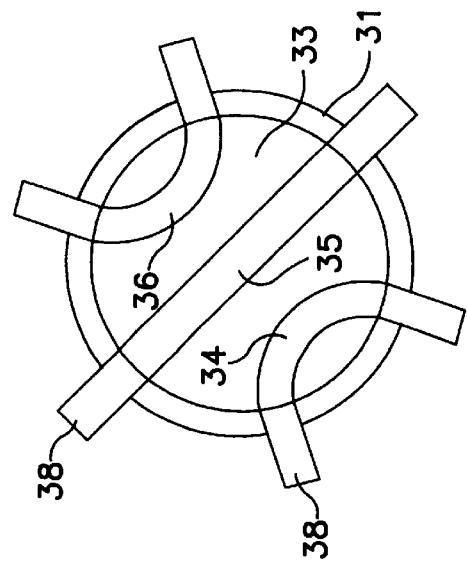
FIG. 7A POSITION 1

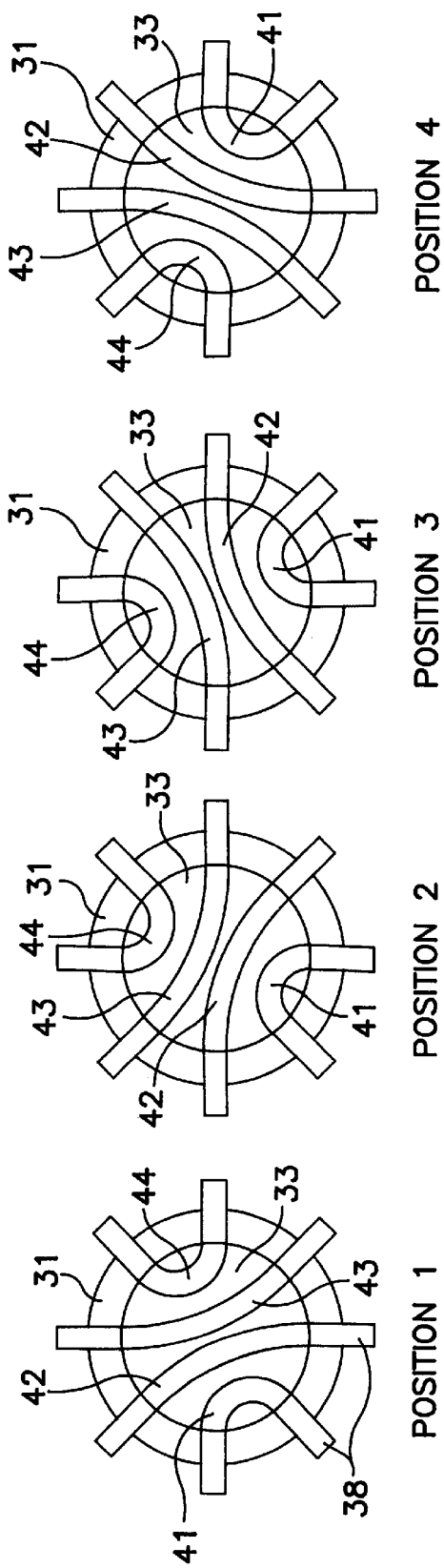

ADSORBENT BASED AIR CONDITIONING SYSTEM

FIELD OF THE INVENTION

This invention relates to an adsorbent based air conditioning system for conditioning an air supply to an enclosed space, such as a building, room, or the passenger compartment of a motor vehicle, to provide a comfortable environment for the occupants thereof and/or to provide a suitable environment for special uses, such as storage of archives, electronic equipment, or certain laboratory operations.

BACKGROUND OF THE INVENTION

Most air conditioning systems are designed to control the temperature and humidity of air within a structure or space such that it will promote human comfort. A known method for providing such control involves the use of adsorbents.

Adsorbents constitute a group of materials that are capable of separating components of a gaseous mixture by preferentially attracting specific gases or vapors to their surfaces. Adsorbent materials, in particular the group known as desiccants, may be used in air conditioning systems to provide a means for the control of moisture and heat content of air. Such materials are generally characterized by a vast number of microscopic pores that provide a large internal surface to which water molecules may be preferentially adhered or adsorbed from air, thus drying or dehumidifying the air. Adsorbents commonly employed for dehumidification processes are capable of attracting and holding large quantities of water. For example, activated alumina is capable of adsorbing water vapor in an amount of about 25 percent of its dry weight. Silica gel can adsorb water vapor in amounts of up to about 40 percent of its weight. The water vapor may be removed from the adsorbent by heating and the adsorbent will again be able to adsorb a similar quantity of water.

SUMMARY OF THE INVENTION

The present invention constitutes an adsorbent based air conditioning system for conditioning air supplied to an enclosed space, such as a building, room, or the passenger compartment of a motor vehicle, aircraft, or the like for the comfort of occupants thereof. The system utilizes two or more interchangeable adsorbent-containing vessels adapted for the passage of air therethrough. In its simplest form the present air conditioning system comprises two adsorbent-containing vessels and is particularly adapted for controlling the relative humidity of the air in a space or compartment to be conditioned. In operation, atmospheric air is passed through a first adsorbent-containing vessel and the water vapor from the air is collected in the vessel by adsorption. While moisture is being collected in the first vessel, relatively dry air is passed through a second vessel, containing moist adsorbent. The air passing through the second vessel collects moisture by desorption and is then passed to the space to be conditioned to provide a more comfortable relative humidity therein. When the first vessel has collected a sufficient amount of water and the adsorbent in the second vessel has become relatively dry and thus less efficient in humidifying the air passing through, the vessels are interchanged so that the first vessel, which is now moist replaces the second vessel, which has now become relatively dry and the process is continued. The interchanging of the vessels and the air streams associated therewith can be carried out manually, or preferably by use of a suitable valve system. In a relatively dry environment, a great deal more air must be passed through the first vessel than through the second vessel so that the first vessel will serve to collect sufficient moisture so that after it is interchanged it will serve effectively to humidify air passing through. In a moist environment, the reverse would be true. The rate of passage of air through each vessel may be controlled, for example, by utilizing suitable variable speed blowers. In a cold weather environment, where hot air from a furnace is used to supply heat, the hot air is generally very dry and humidification is generally desirable. In this case the hot air from the furnace may be passed through the second vessel to humidify the air before it enters the room to be conditioned.

In alternate embodiments, a third and a fourth vessel may be added to the system and the system may be used to control humidity and temperature in either a cooling or a heating mode. Thus, for example, in a three vessel system, ambient air is dehumidified and warmed by adsorption of the water vapor therein as it passes through a first adsorbent-containing vessel; then cooled by passage through a heat exchanger. The cool, dry air leaving the heat exchanger is then passed through a second vessel containing moist adsorbent. There it is humidified and further cooled by desorption before flowing to the enclosed space. In the process, the adsorbent in the first vessel will gradually become saturated with moisture and generally less effective and the adsorbent in the second vessel will become drier and less effective for its purpose. At the same time, a third adsorbent-containing vessel is prepared, or regenerated, by passing a current of hot air therethrough to dry the adsorbent by desorption so that the regenerated vessel may be used as a replacement for the first vessel when the first vessel has become saturated. After vessel three has been satisfactorily dried, it may be cooled by passage of a current of cool dry air therethrough before being used a replacement for the first vessel. Various sources of cool air may be employed for this purpose, as will be seen in the detailed description hereinbelow. When the first vessel has become saturated and is replaced, it serves as a replacement for the second vessel, which must contain moisture and the second vessel, in turn, will replace vessel three and be regenerated.

The adsorbent materials that may be employed in the adsorbent-containing vessels of the present invention include those commonly known to preferentially adsorb water vapor, in particular, those desiccants commonly available as particulate solids. Such desiccants include, for example, activated carbon, silica gel, activated alumina, zeolite, and the like. The preferred adsorbent is silica gel. The vessels may contain the adsorbent as a monolithic structure or in particulate (granular) form, that is, as a particle bed-type adsorbent column. Typically, the vessel will be column-shaped and, in the case of a particle bed-type adsorbent column, the column will be vertically oriented and the air stream to be passed through will enter the column from the bottom and exit from the top. One of the disadvantages of the particle bed-type column is that, if it is oriented horizontally, the particles will tend to settle downwardly and the air stream will channel above it, thus minimizing or avoiding contact with the adsorbent particles.

The preferred adsorbent-containing vessels for use in the system of the present invention are the monolithic structures or adsorption tubes disclosed in my co-pending application Ser. No. 08/740,113, the subject matter of which is hereby incorporated by reference.

The preferred monolithic adsorption tubes comprise a tubular housing, generally of metal or plastic, containing an adsorbent material body portion in monolithic form wherein the adsorbent particles are held together by a binder or bonding agent. The monolithic adsorbent body portion is further characterized by a plurality of tunnels extending therethrough, substantially parallel to the tubes axis, for the passage of a gas mixture, such as, air. The adsorbent employed may be selected from any of various known adsorbents available in granular or particulate form. The monolithic adsorbent structure may be prepared, as disclosed in the aforementioned co-pending application Ser. No. 08/740,113, by mixing the particles in a suitable binder, such as clay, and extruding the mixture through a die to form a monolithic structure and then inserting the structure into a tubular housing. The parallel tunnels may be formed during the extrusion process or afterward, for example, by drilling. The fact that the monolithic tube can be used in a horizontal position as well as a vertical position renders it more adaptable for use in applications where space is limited, such as in an automobile air conditioning system.

BRIEF DESCRIPTION OF THE DRAWINGS

FIG. 7 (7A–C) depicts a top cross-sectional view of a rotatable three way valve showing the three possible valve positions.

FIG. 8 (8A–D) shows a top cross-sectional view of a rotatable four way valve showing the four possible valve positions.

DETAILED DESCRIPTION

Figure 1:
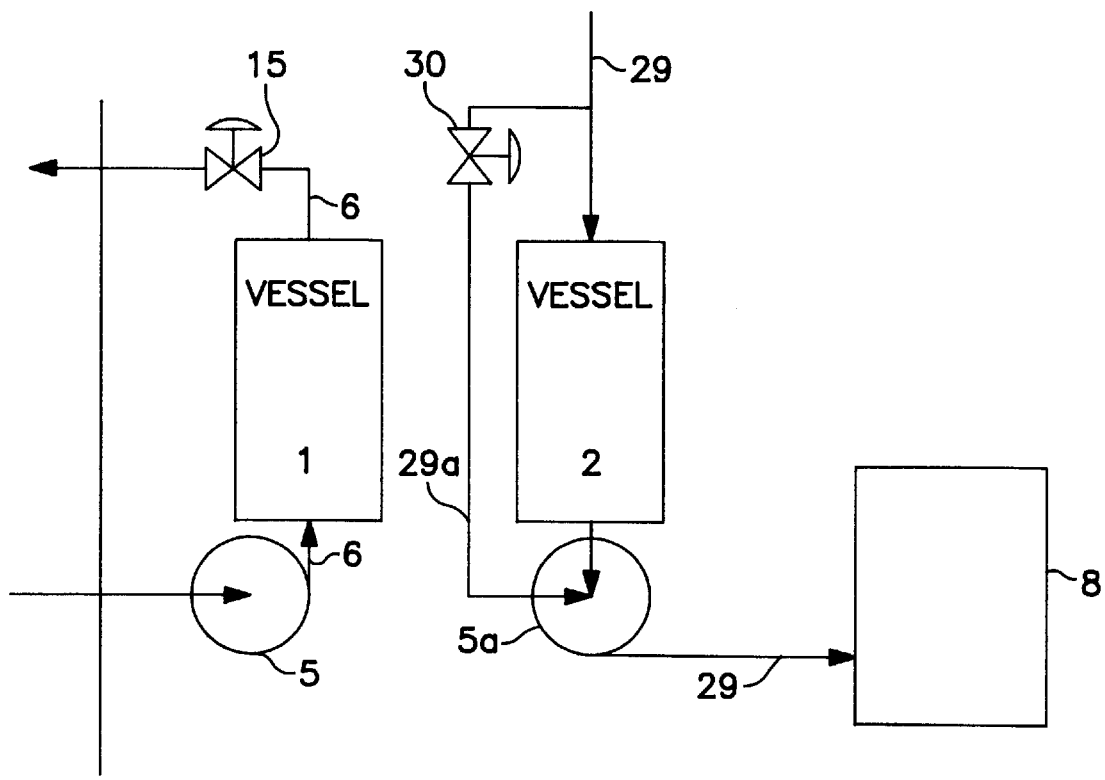
FIG. 1 is a schematic illustration of an adsorbent-based air conditioning system of the invention, utilizing two adsorbent-containing vessels for humidity control.

FIG. 1 illustrates schematically an adsorbent-based air conditioning system for controlling the humidity of a stream of air being supplied to a space to be conditioned. The system includes two interchangeable adsorbent-containing vessels to collect and concentrate moisture from the environment and use the collected moisture to increase the relative humidity of a space to be conditioned for the comfort of the occupants thereof. In the system shown, an air stream 6 of atmospheric air is directed by blower 5 through adsorbent-containing vessel 1 where the moisture in the air stream is collected by adsorption. The dehumidified air stream 6 may then vented to the atmosphere through valve 15. In the meantime, a second air stream 29, is drawn through the moisture laden adsorbent in vessel 2 by blower 5a and is humidified by desorption as it passes therethrough. Blower 5a passes the humidified air into space 8 to provide a suitable relative humidity for the comfort of the occupants thereof. To adjust the level of relative humidity of the air stream 29 entering space 8, a portion of the air stream 29 may be diverted prior to entering vessel 2 to form branch air stream 29a which bypasses the humidification step and subsequently rejoins air stream 29 downstream of vessel 2 at a point where blower 5a directs the mixture to space 8. The amount of air forming branch air stream 29a is controlled by valve 30. The air supply for air stream 29 (and branch air stream 29a) may be drawn from fresh or atmospheric air or, in the case of cool weather, if space 8 must be heated, the air supply may be hot air, for example, from a furnace, solar heater or the like. Alternatively, the dried air exiting vessel 1 may be heated, or cooled, depending on weather conditions and then used as the air supply for air stream 29. When vessel 1 has collected sufficient moisture and vessel 2 has become relatively dry and less efficient for humidification, the vessels may be interchanged and the process continued. The interchange of the vessels may be accomplished manually or by means of a suitable valve means. It will be apparent that if the system is used in a relatively dry environment, more air may have to be passed through vessel 1 than vessel 2 in order to collect a sufficient amount of water to provide for humidification in the following step.

Figure 2:
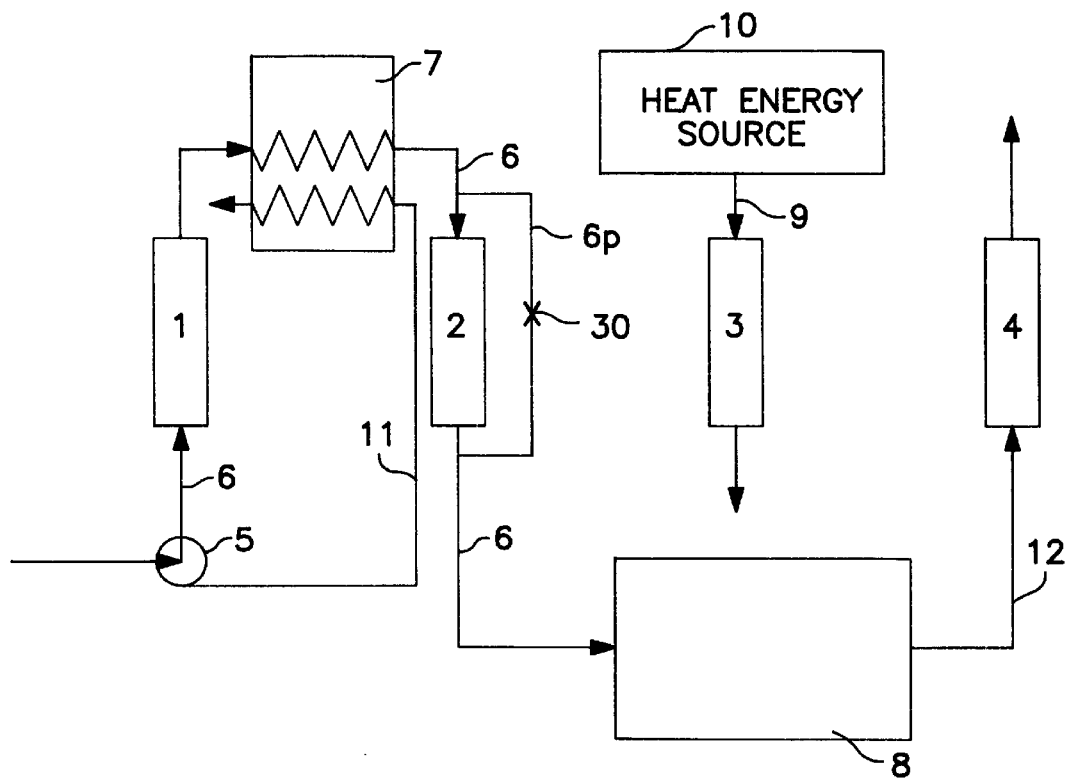
FIG. 2 is a schematic representation of an adsorbent-based air conditioning system according to the invention, for humidity control and cooling, utilizing four adsorbent-containing vessels and providing means for regenerating the adsorbents.

FIG. 2 illustrates schematically and adsorbent-based air conditioning system for the conditioning by cooling and humidifying, of a stream of air being supplied to a space to be conditioned and providing for the regeneration of the adsorbents employed in the system. The system shown utilizes interchangeable adsorbent-containing vessel 1, 2, 3, and 4. In response to blower 5, a stream of ambient air 6 is drawn in to the system and passed into vessel 1 where it is dehumidified by adsorption as it passes therethrough. In the adsorption process, the water vapor in the air passing through vessel 1 releases heat energy as it is adsorbed, heating both the air and the adsorbent. The heated and dried air stream exiting vessel 1 is then cooled as it passes through heat exchanger 7. In the embodiment illustrated, air stream 6 may be cooled to near ambient temperature when it flows through heat exchanger 7 in counterflow to the atmospheric air stream 11 also being sent from blower 5. The cooled dry air stream 6 exiting the heat exchanger then passes through vessel 2 containing moist adsorbent. Passage of the air through vessel 2 results in desorption and entry of the desorbed water vapor into the air stream 6 with a resultant cooling and humidifying of the air. The cooled and humidified air stream 6 passes into the space to be conditioned 8, to provide a comfortable environment for the occupants thereof.

To permit adjustment of the level of relative humidity of the airflow into space 8, a portion of air stream 6 may be diverted prior to entering vessel 2 to form branch air stream 6p which bypasses the humidification step and rejoins air stream 6 prior to entry into space 8. The amount of air diverted and thus the relative humidity of air stream 6 as it enters space 8 is controlled by valve 30.

During this process, the adsorbent in vessel 1 will gradually become saturated and less effective in drying the air passing therethrough; and the adsorbent in vessel 2 will gradually become desorbed and less effective in cooling and humidifying the air passing therethrough. In the meantime, a heated air stream 9 is passed through vessel 3 to dry the adsorbent contained therein by desorption. At the same time, adsorbent-containing vessel 4, which has previously been dried and heated by desorption, is cooled by passing therethrough an air stream 12 exiting from space 8. It will be apparent that other sources of air could be used to cool vessel 4 as well. For example, a portion of air stream 6 could be routed through vessel 4 for this purpose.

Air stream 9 is heated by a heat energy source 10. Various heat energy sources may be employed for this purpose. Preferably and advantageously, the heat energy source is a heat exchanger utilizing nominally "free" energy such as the heat energy from a solar collector or, if the system is being applied to an automobile, the heat contained in engine exhaust.

The adsorbent-containing vessels are interchangeable, so that when the adsorbent in vessel 1 becomes saturated and is no longer effective in removing moisture from air stream 6, the vessels can be rotated and vessel 1 replaces vessel 2 and the latter, now at least partially dried, replaces vessel 3 to become regenerated or more completely dried by hot air stream 9, and the now dry, heated vessel 3, replaces vessel 4, and is in position to be cooled. Vessel 4, which has been regenerated by drying and cooling, replaces vessel 1. The rotation of the vessels may be effected by physically or manually changing them or, preferably, by means of a valving system (not shown in FIG. 2). In the embodiment illustrated, vessel 4 has been incorporated into the system to provide a cooling stage for vessel 3 to be rotated into. The use of a fourth vessel to accomplish this purpose is optional. As will be seen in FIG. 3, it is possible to accomplish the cooling of vessel 3 after desorption and heating, in a three vessel system, by passing cool air through while the vessel (3) remains in place. For this purpose, dry ambient air may be used or cool dry air may be routed from a source within the system, such as a portion of the air from the line entering vessel 2.

Figure 3:
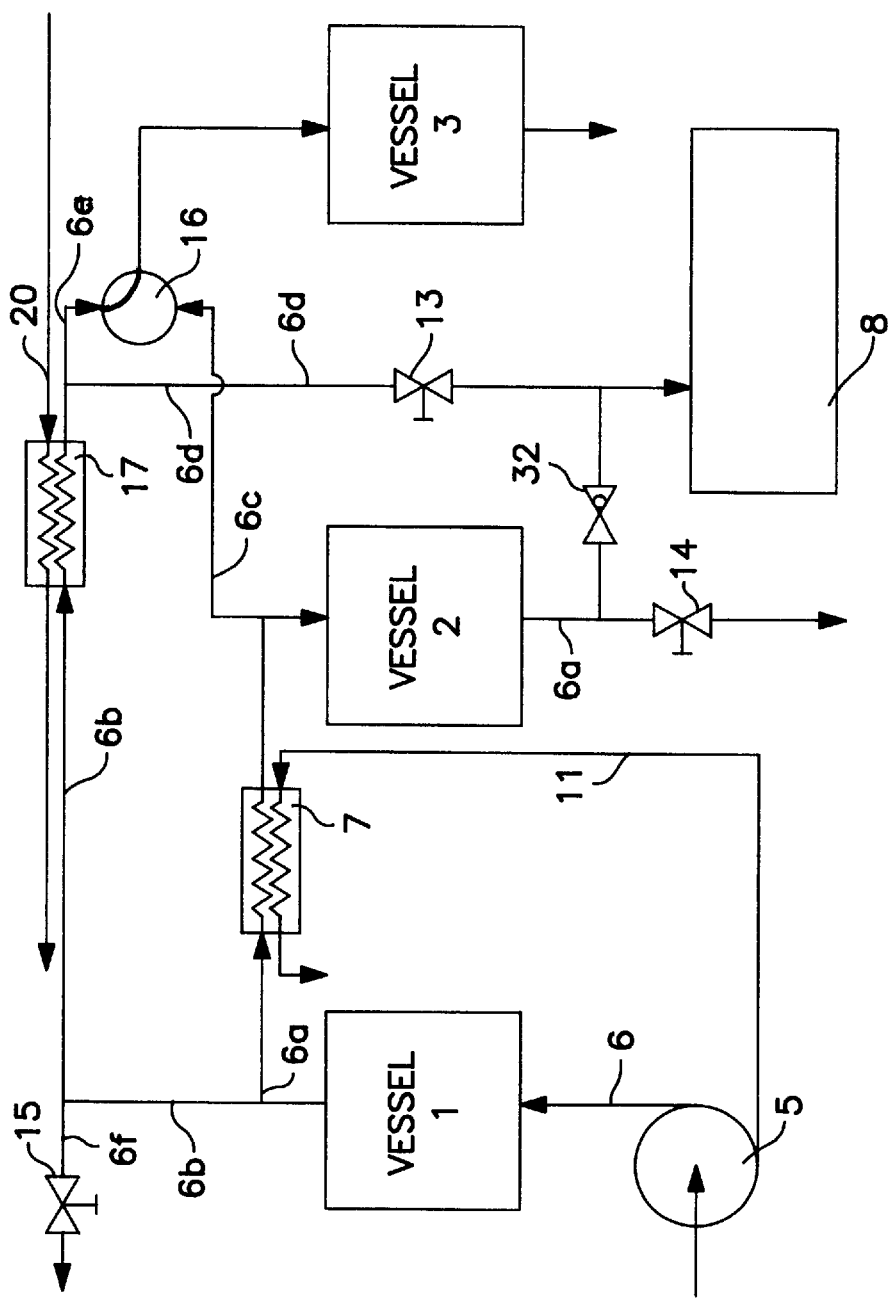
FIG. 3 is a schematic representation of an embodiment of the adsorbent-based air conditioning system of the invention utilizing three adsorbent-containing vessels and designed for selective heating or cooling of a space such a room, building, or the passenger compartment of a vehicle.

FIG. 3 illustrates schematically an embodiment of the present invention utilizing three adsorbent-containing vessels and adapted for conditioning air with respect to both humidity and temperature and incorporating both a cooling and a heating mode within the system. In the system shown, ambient air enters the system through blower 5 and is divided into two air streams: air stream 6 and air stream 11. Air stream 6 is routed through vessel 1 containing an adsorbent drier than the ambient air. In vessel 1 the air is dehumidified and heated by adsorption as it passes therethrough. The exiting air stream separates into three component air streams 6a, 6b, and 6f. Air stream 6a then passes to heat exchanger 7 where it is cooled to near ambient temperature as it passes through in counterflow to air stream 11 before moving on to vessel 2 where it is further cooled and partly humidified by desorption as it passes therethrough. Air stream 6a, thus conditioned, is routed through one way valve 32 to the space to be conditioned 8 to provide a cool and comfortable atmosphere for the occupants therein. During this cooling cycle, flow rate valve 13 and flow rate valve 14 are in closed position.

Air stream 6b is directed through heat exchanger 17 where it is heated as it passes in counterflow to a hot gas stream 20. The heat energy source (not shown) for hot gas stream 20 may be a solar heater, a furnace, or the like, or preferably, in the case of an air conditioner/heater system for an automotive vehicle, engine exhaust. When engine exhaust is employed as the heat energy source, the air stream 6b may leave the heat exchanger at a temperature in excess of 600 degrees Fahrenheit.

The heated air stream 6b exiting the heat exchanger 17 is then divided in to two heated air streams, 6d and 6e. Heated air stream 6d is directed to heat control valve 13 which controls its entry into the space to be conditioned 8. If heat control valve 13 is open, a portion of the heated air stream 6d may be mixed with the cool air stream 6a to adjust the temperature as desired, for example, to raise the temperature of the entering air stream and heat the space 8 during cold weather conditions. The proper mixture may be achieved using heat control valve 13 and flow rate valve 14 to adjust the temperature to that desired.

Heated air stream 6e is directed through two-way valve 16, open, as illustrated, to route the air stream through adsorbent-containing vessel 3 where the moisture held in the adsorbent is removed by desorption.

When the moisture has been sufficiently desorbed in vessel 3, two-way valve 16 may be turned to direct cool dry air stream 6c, to flow through and cool the adsorbent in vessel 3. When vessel 3 has been regenerated in this manner, that is, when the adsorbent therein has been dried and cooled, it is ready for use as a replacement for vessel 1, when needed.

In dry climates or during dry weather when the ambient air is very dry, valve 15 may be opened to vent air stream 6f and allow a greater air flow through vessel 1 to increase the amount of moisture adsorbed in vessel 1 so that it will contain sufficient moisture to cool and humidify when it is rotated to replace vessel 2.

When vessel 1 has become sufficiently saturated and less effective in drying air stream 6, the vessels may be rotated so that vessel 3 replaces vessel 1; vessel 1 replaces vessel 2; and vessel 2 replaces vessel 3.

Figure 4:
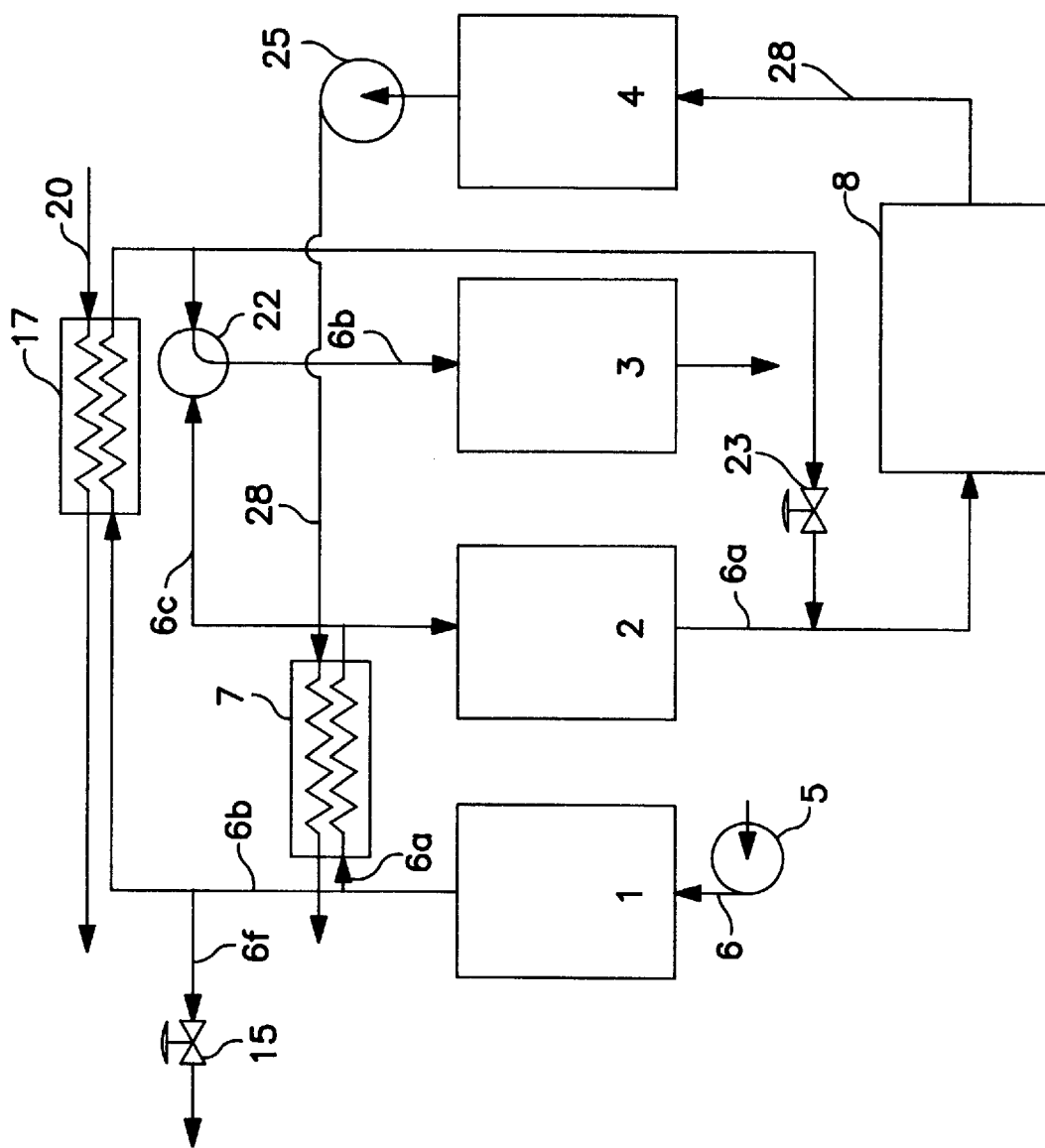
FIG. 4 is a schematic representation of another embodiment of the adsorbent-based air conditioning system of the invention utilizing four adsorbent-containing vessels and designed for selective heating or cooling.

In an alternate embodiment, the air supply, for example, to an automobile passenger compartment, may be conditioned—either heated or cooled—using four adsorbent-containing vessels in the manner illustrated schematically in FIG. 4. In the system shown, blower 5 sends air stream 6 through vessel 1 where it is dried and heated as it passes in contact with the adsorbent contained therein. As the dry, heated air stream 6, exits vessel 1, it divides into three branch air streams 6a, 6b, and 6f. Branch air stream 6a is routed through heat exchanger 7 where it is cooled to near ambient temperature as it passes through in counterflow to air stream 28 before moving on to vessel 2 where it is further cooled and humidified by desorption as it passes therethrough. Air stream 6a, thus conditioned, is routed to the space to be conditioned 8 to provide a cool and comfortable atmosphere therein. Air stream 6b is directed through heat exchanger 17 where it is heated as it passes in counterflow to a heated gas stream 20 of exhaust from the automobile's engine (not shown). When two-way valve 22 is in the position as shown in FIG. 4, the hot air stream 6b is routed through adsorbent-containing vessel 3 where the moisture held in the adsorbent is removed by desorption.

If the air flowing into the passenger compartment from vessel 2 is colder than desired, for example, in cold weather operation, valve 23 may be opened and adjusted as desired to allow hot air from heat exchanger 17 to mix with the air entering the passenger compartment.

When vessel 3 has become sufficiently desorbed, it may be cooled by turning valve 22 (clockwise 90° from the position shown) to route cool air stream 6c to vessel 3.

Blower 25 causes the relatively cool air stream 28 leaving the passenger compartment to flow through vessel 4, providing a further cooling effect therein, and through heat exchanger 7 to cool inlet air stream 6a that is routed to vessel 2.

In the process, it is necessary that vessel 1 adsorb sufficient water so that it may subsequently be used as a replacement for vessel 2 where moisture is required for humidification and cooling. When the ambient air is very dry, it may be necessary to cause a greater amount of air to flow through vessel 1 to allow a greater amount of moisture to be adsorbed therein. This may be accomplished by opening valve 15, thus venting air stream 6f.

At a selected time, preferably when the adsorbent in vessel 1 has become saturated, the vessels are rotated so that vessel 4 replaces vessel 1; vessel 1 replaces vessel 2; vessel 2 replaces vessel 3; and vessel 3 replaces vessel 4.

In the embodiments of the present invention as described herein, it may be advantageous to reverse the direction of airflow when the vessels are rotated. For example, when moisture is collected by adsorption in vessel 1, the adsorbent will approach saturation first in the region closest to the air inlet. As the flow of air through the vessel continues, the leading edge of the zone of saturation, or region of greatest moisture adsorption, will gradually advance toward the outlet as more and more moisture is adsorbed. If the vessels are rotated before vessel 1 is completely saturated, the moisture collected therein will be more concentrated in the region closest to the inlet and less concentrated in the region closest to the outlet. In this instance, when the vessels are rotated and vessel 1 replaces vessel 2, it is preferable to reverse the orientation of the vessel with respect to the direction of air flow so that in the new position, as vessel 2, the incoming air will enter the region of lowest moisture content and exit through the region of highest moisture content.

Figure 5:
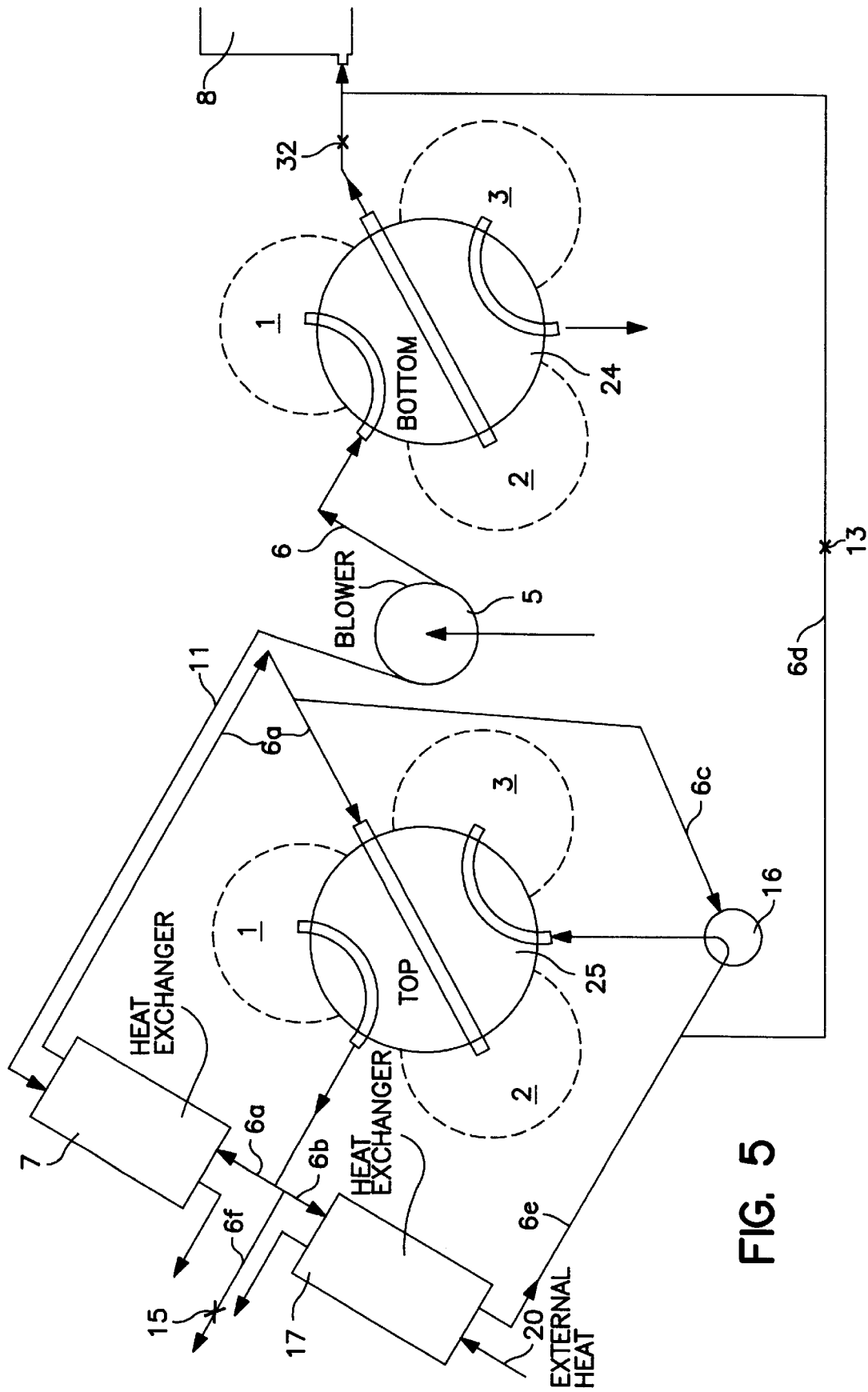
FIG. 5 is a schematic representation of a three vessel system similar to that shown in FIG. 3 utilizing two three-way concurrently rotatable valves to control the flow of air.
Figure 6B:
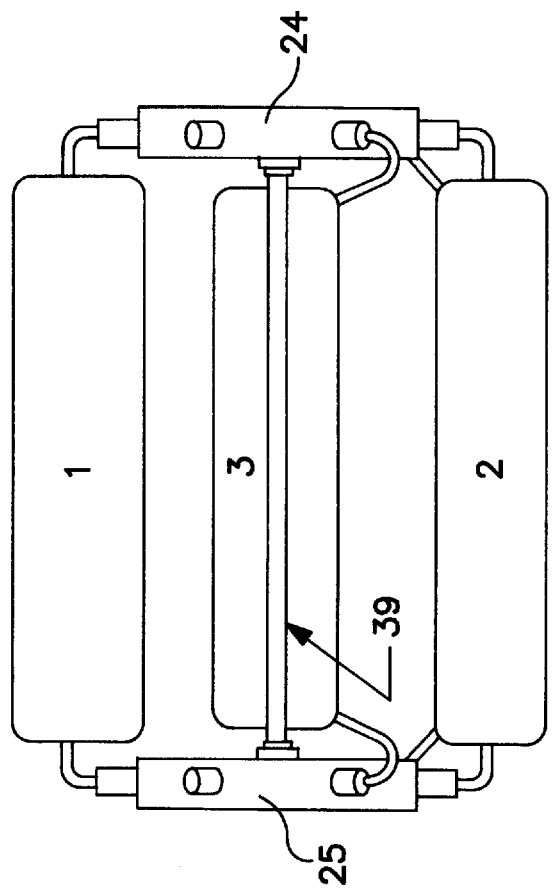
FIG. 6 (6A and 6B) illustrates a three vessel system such as that of FIG. 5 incorporating two yoked concurrently rotatable three way valves and adsorbent vessels, shown in a side sectional view (FIG. 6B), and a rotatable valve, shown in top sectional view (FIG. 6A).
Figure 6A:
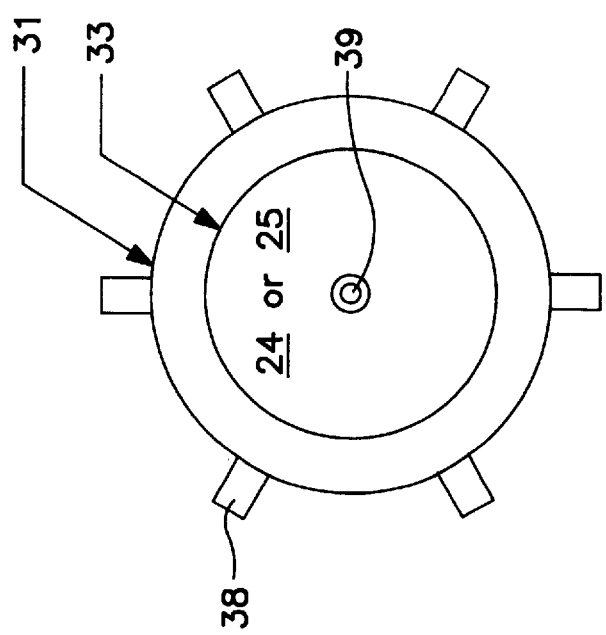

In a preferred embodiment, the air conditioning systems of the present invention incorporate the adsorbents in the form of monolithic adsorption tubes with the flow of gases or vapors being controlled by rotatable multiple valves in the manner shown in FIGS. 5–8. FIG. 5 shows the use of concurrently rotatable three way valves 24 and 25 to control the passage of gases or vapors in a three vessel system of the type illustrated in FIG. 3. In the system shown, ambient air enters the system through blower 5 and is divided into two air streams: air stream 6 and air stream 11. Air stream 6 is routed through rotatable valve 24 into the bottom of vessel 1, as shown in the bottom view at the right side of FIG. 5. As the dehumidified air exits vessel 1, it passes through rotatable valve 25 and subsequently separates into three component air streams 6a, 6b, and 6f. At the same time, valve 25 directs the flow of air stream 6a into the top of vessel 2 and the air stream exiting the bottom of vessel 2 is directed by valve 24 to compartment 8. At the same time heated air stream 6e is directed by two-way valve 16 and valve 25 into the top of vessel 3 and the air stream exiting vessel 3 at the bottom is vented through valve 24 to the atmosphere. When it is desired to rotate or interchange the vessels, for example, when vessel 1 has become substantially saturated, it may be effected by rotating valves 24 and 25, 60 degrees counter-clockwise, as shown so that vessel 3 replaces vessel 1; vessel 1 replaces vessel 2; and vessel 2 replaces vessel 3. In practice, the valves 24 and 25 are yoked by a connecting rod, not shown in this figure. (See FIG. 6B.) Thus both valves are easily turned at the same time. As seen in FIG. 6A, each rotatable valve, such as valves 24 or 25, consists of two components, a cap 31 and a rotor 33. The cap 31 of a rotatable three way valve contains six evenly spaced ports 38 that are connected to the vessels and to the sources and destinations of the fluids being directed through the valve. The cap 31 is stationary. The rotor 33 in each valve 24 and 25 is connected by connecting rod 39, so that the valves can be rotated concurrently as desired to direct the alignment of their internal passages to specific ports to form any of three different combinations of pathways as illustrated by the three different positions shown in FIGS. 7A–7C. The use of monolithic adsorption tubes and yoked rotatable valves, in the manner described, permits the construction of a compact unit that may be employed in various orientations, such as vertically, horizontally, or other and is particularly useful for situations where space is limited, such as for air-conditioning and heating units for automobiles and the like. Although such a unit has been described in detail for a three vessel system, it will be apparent that the concept is appropriate for four vessel systems, such as the system shown in FIG. 4, using valves such as that shown in various positions in FIGS. 8A–8D. The valve depicted in FIGS. 8A–D is characterized by four passageways 41, 42 43, and 44, within the rotor 33, which may be aligned with the eight evenly spaced ports in the cap 31 as desired in the four positions shown. Other multi-passageway valves, not illustrated here may be used in systems employing five, six, seven, eight, or more vessels.

Figure 9:
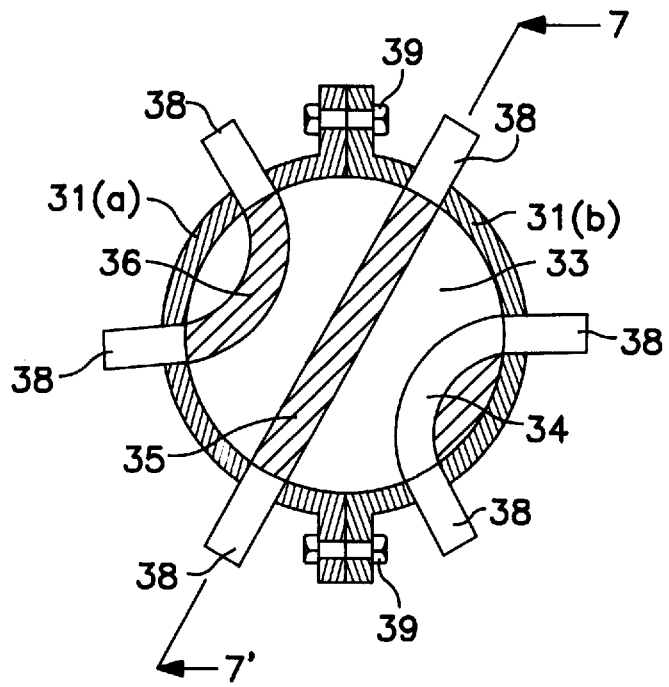
FIG. 9 is a top cross-sectional view of a multi-position rotatable valve showing details of construction.
Figure 10:
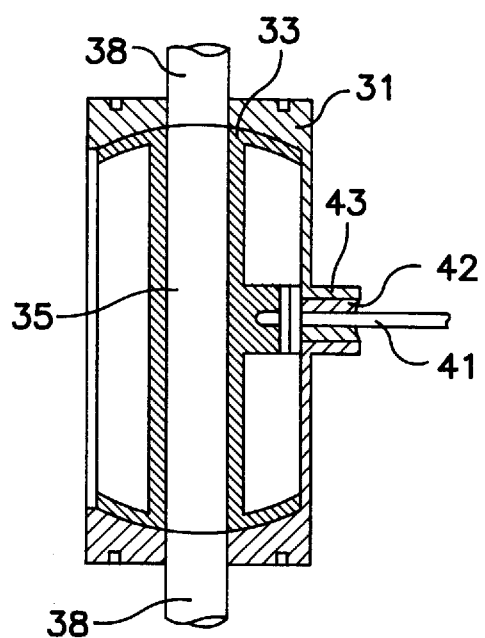
FIG. 10 is a side cross-sectional view taken along the line 7–7' of FIG. 9.

FIGS. 9 and 10 set forth a top cross-sectional view and a side cross-sectional view, respectively, of a three-way valve of the type that may be utilized in a three vessel system, such as that illustrated schematically in FIG. 5. Such a valve is shown in various positions, without construction details in FIG. 7. The valve comprises a cap 31 formed by two outer casings 31a and 31b and a rotor 33, rotatably disposed therein. In the valve illustrated, the rotor 33 has three passageways 34, 35, and 36 and six ports 38. Shaft 41, as shown in FIG. 10, is attached to the rotor 33 through inlet 43 and bushing 42 on the cap 31. The turning of shaft 41 rotates the rotor to provide fluid communication between the passageways and the ports to provide the desired flow routes (as depicted in FIGS. 7 and 10.) Shaft 41 may also be connected to a second, similar valve, by means of a connector such as connecting rod 39, illustrated in FIGS. 6A and B, to provide concurrent rotation. Although FIG. 10 illustrates a valve having three passageways and six ports, it will be understood that the number of ports and passageways and thus the number of actual routes through the valve may vary and will be determined by the particular application for which the valve is intended. (See, for example, FIGS. 8 A–D depicting a similar valve having four passageways and eight ports.) While the invention has been described with reference to preferred embodiments thereof, it will be understood by those skilled in the art that various changes in form and detail may be made without departing from the spirit and scope of the invention.

What is claimed is:

1. An adsorbent-based air conditioning method utilizing a multiplicity of interchangeable adsorbent-containing vessels, each vessel containing an adsorbent characterized by the ability to preferentially adsorb water vapor from air, the method comprising the steps of:

a) passing a stream of air through a first vessel containing a relatively dry adsorbent whereby moisture is removed from the stream of air and collected by adsorption in said first vessel;

b) at the same time, humidifying and cooling a stream of relatively dry air by passage through a relatively moist adsorbent contained in a second vessel by desorption of the adsorbed moisture contained in said second vessel;

c) passing humidified air from step (b) to a space to be conditioned;

d) periodically interchanging said first vessel and said second vessel when said first vessel contains more adsorbed moisture than said second vessel.

2. A method according to claim 1 wherein at least a portion of said stream of air in step (b) is a stream of relatively dry air that has been dried by passage through said first vessel.

3. A method according to claim 1 wherein said stream of air in step (b) is a stream of air that has been warmed by a heat source.

4. A method according to claim 3 wherein the heat source is a furnace.

5. A method according to claim 3 wherein the heat source is a solar collector.

6. A method according to claim 3 wherein the space to be conditioned is the passenger compartment of an automotive vehicle and the heat source is exhaust gases from an engine.

7. A method according to claim 1 wherein at least a portion of the stream of air in step (a), after passing through said first vessel, is vented to the atmosphere.

8. A method according to claim 1 wherein at least a portion of the stream of air in step (a), after passing through said first vessel, is cooled by passing through a heat exchanger and then becomes the stream of air that is humidified by passing through said second vessel in step (b).

9. A method according to claim 1 utilizing two interchangeable adsorbent-containing vessels.

10. A method according to claim 1 wherein the adsorbent contained in the vessels is selected from the group consisting of zeolite, activated alumina, activated carbon, and silica gel.

11. A method according to claim 10 wherein said vessels are monolithic adsorption tubes, each monolithic adsorption tube comprising a tubular housing containing an adsorbent material body portion in monolithic form and a plurality of tunnels substantially parallel to the tube's axis extending through the adsorbent material body portion substantially the length of the tube.

12. A method according to claim 8 utilizing three interchangeable adsorbent-containing vessels, comprising the steps of:
   a) dehumidifying air by adsorption in passing through a first vessel containing a relatively dry adsorbent;
   b) cooling the air from step (a) by passage through a heat exchanger;
   c) humidifying and further cooling the air from step (b) by passage through a second vessel by desorption of adsorbed water contained therein;
   d) passing cooled and humidified air from step (c) to a space to be conditioned;
   e) separately regenerating and drying the adsorbent in a third vessel by passing heated air therethrough;
   f) cooling the adsorbent in said third vessel by passing cool relatively dry air therethrough;
   g) periodically interchanging said first, second, and third vessels so that:
      said third vessel replaces said first vessel;
      said first vessel replaces said second vessel; and
      said second vessel replaces said third vessel.

13. A method according to claim 1 utilizing four interchangeable adsorbent-containing vessels, comprising the steps of:
   a) dehumidifying air by adsorption in passing through a first vessel containing a relatively dry adsorbent;
   b) cooling the air from step (a) by passage through a heat exchanger;
   c) humidifying and cooling the air from step (b) by passing through a second vessel by desorption of the adsorbed water contained therein;
   d) passing cooled and humidified air from step (c) to a space to be conditioned;
   e) separately regenerating and drying the adsorbent in a third vessel by passing heated air therethrough;
   f) passing air exiting from said space through a fourth vessel to cool the adsorbent contained therein;
   g) periodically interchanging said first, second, third, and fourth vessels so that:
      said fourth vessel replaces said first vessel;
      said third vessel replaces said fourth vessel;
      said second vessel replace said third vessel; and
      said first vessel replaces said second vessel.

14. A method according to claim 13 wherein said first, second, third and fourth vessels are interchanged when the adsorbent in said first vessel has become substantially saturated.

15. An air conditioning and heating method utilizing at least three interchangeable vessels, each vessel containing an adsorbent characterized by the ability to preferentially adsorb water vapor from air, the method comprising the steps of:
   a) causing a stream of ambient air to be dehumidified by adsorption in passage through an adsorbent-containing first vessel to provide a stream of dehumidified air exiting said first vessel and separating said stream of dehumidified air into at least three component air streams;
   b) cooling a first component air stream from step (a) by passage through a cooling heat exchanger in counterflow to a stream of ambient air;
   c) humidifying and further cooling the first component air stream that has been cooled in step (b), by passing through a second vessel by desorption of adsorbed water contained therein;
   d) passing cooled and humidified air from step (c) through a one-way valve to a space to be conditioned; while at the same time,
   e) heating a second component air stream from step (a) by passing through a heat exchanger in counterflow to a stream of hot gas from a heat energy source to provide at least two heated air streams;
   f) allowing a first heated air stream from step (e) under control of a heat control valve, to access said space to be conditioned, alone or in admixture with the cool and humidified air from step (c);
   g) allowing a second heated air stream from step (e) to flow through a two-way valve to a third vessel containing moist adsorbent and passing therethrough until said moist adsorbent has been substantially dried by desorption;
   h) then repositioning said two-way valve to block passage of the second heated air stream and permit the flow of a third component air stream from step (a) through the two-way valve to said third vessel to cool the adsorbent therein;
   i) controlling the mixture of the air and temperature thereof, flowing into the space to be conditioned by adjustment of said one-way valve and said heat control valve;
   j) periodically interchanging said first, second, and third adsorbent-containing vessels so that:
      third vessel replaces said first vessel;
      said second vessel replaces said third vessel; and
      said first vessel replaces said second vessel.

16. A method according to claim 15 wherein said first, second, and third vessels are interchanged when the adsorbent in said first vessel has become substantially saturated.

17. A method according to claim 15 wherein the adsorbent contained in the adsorbent-containing vessels is selected from the group consisting of zeolite, activated alumina, activated carbon, and silica gel.

18. A method according to claim 15 wherein said adsorbent-containing vessels are monolithic adsorption tubes, each monolithic adsorption tube comprising a tubular housing containing an adsorbent material body portion in monolithic form, and a plurality of tunnels substantially parallel to the tube's axis extending through the adsorbent material body portion substantially the length of the tube.

19. A method according to claim 18 wherein said adsorbent material body portion comprises a bonding agent and an adsorbent material selected from the group consisting of activated carbon, silica gel, activated alumina and zeolite.

20. A method according to claim 19 wherein air flow to and from each vessel is directed by means of two multi-passageway rotatable valves, said valves being concurrently rotatable.

21. A method according to claim 20 wherein said space to be conditioned is the passenger compartment of an automotive vehicle and said stream of hot gas from a heat energy source is exhaust gas from an automobile engine.

22. An air conditioning apparatus comprising a plurality of interchangeable vessels, each containing an adsorbent characterized by the ability to preferentially adsorb water vapor from air; at least one counterflow heat exchanger; and an air flow means for the movement of a stream of air; said vessels being arranged so that a first vessel, containing a relatively dry adsorbent, is in fluid communication with a cooling heat exchanger which, in turn, is in fluid communication with a second vessel, containing a relatively moist adsorbent, said second vessel is in fluid communication with a space to be conditioned so that, in response to said air flow means a stream of air may pass through said first vessel, then at least a portion of said stream of air may then pass through said cooling heat exchanger, then at least a portion of said stream of air may then pass through said second vessel, and then into said space to be conditioned.

23. An air conditioning apparatus according to claim 22 having a third interchangeable vessel separate from said first and second vessels and having a drying means associated therewith.

24. An air conditioning apparatus according to claim 23 having a fourth interchangeable vessel positioned to receive a flow of cool air to cool the adsorbent therein.

25. An air conditioning apparatus according to claim 22 wherein said interchangeable vessels contain an adsorbent selected from the group consisting of activated carbon, silica gel, activated alumina and zeolite.

26. An air conditioning apparatus according to claim 25 wherein said vessels are monolithic adsorption tubes, each monolithic adsorption tube comprising a tubular housing containing an adsorbent material body portion in monolithic form and having a plurality of tunnels substantially parallel to the tube's axis extending through the adsorbent material body portion substantially the length of the tube.

27. An air conditioning apparatus according to claim 26 wherein said adsorbent material body portion comprises a bonding agent and an adsorbent material selected from the group consisting of activated carbon, silica gel, activated alumina, and zeolite.

28. An air conditioning apparatus according to claim 27, additionally comprising rotatable valve means for directing the flow of air through said apparatus.

29. An air conditioning apparatus according to claim 28 wherein said rotatable valve means comprises two concurrently rotatable multi-passageway valves.

30. An air conditioning apparatus according to claim 22 additionally comprising a means for venting to the atmosphere air exiting from said first vessel.

* * * * *